(12) United States Patent
Prasad et al.

(10) Patent No.: US 12,056,104 B2
(45) Date of Patent: Aug. 6, 2024

(54) DATABASE LIVE MOUNTS USING CONTAINERS

(71) Applicant: Rubrik, Inc., Palo Alto, CA (US)

(72) Inventors: Udbhav Prasad, Mountain View, CA (US); Prasenjit Sarkar, Los Gatos, CA (US)

(73) Assignee: Rubrik, Inc., Palo Alto, CA (US)

( * ) Notice: Subject to any disclaimer, the term of this patent is extended or adjusted under 35 U.S.C. 154(b) by 84 days.

(21) Appl. No.: 17/720,459

(22) Filed: Apr. 14, 2022

(65) Prior Publication Data

US 2023/0334029 A1    Oct. 19, 2023

(51) Int. Cl.
*G06F 16/21*    (2019.01)
*G06F 11/14*    (2006.01)

(52) U.S. Cl.
CPC ........ *G06F 16/219* (2019.01); *G06F 11/1464* (2013.01); *G06F 2201/84* (2013.01)

(58) Field of Classification Search
CPC . G06F 16/219; G06F 11/1464; G06F 2201/84
See application file for complete search history.

(56) References Cited

U.S. PATENT DOCUMENTS

| | | | | |
|---|---|---|---|---|
| 10,114,706 | B1* | 10/2018 | Chougala | G06F 9/5027 |
| 2016/0110258 | A1* | 4/2016 | Haustein | G06F 16/00 |
| | | | | 707/646 |
| 2019/0050302 | A1* | 2/2019 | Juniwal | G06F 3/0689 |
| 2022/0308913 | A1* | 9/2022 | Kirmse | G06F 11/3058 |
| 2022/0345483 | A1* | 10/2022 | Shua | H04L 9/0825 |

* cited by examiner

*Primary Examiner* — Merilyn P Nguyen
(74) *Attorney, Agent, or Firm* — Holland & Hart LLP

(57) ABSTRACT

Techniques for data management are described. A request to mount a version of a database based on data stored at a computing system may be received. Based on receiving the request, a container at the computing that is configured to support operating the version of the database may be configured. Based on creating the container, a database request for the version of the database may be received at the container. In response to the database request, the container may access a set of data stored at the computing system, the set of data being associated with the version of the database. The container may output a response to the database request based on accessing the set of data.

18 Claims, 7 Drawing Sheets

_DATABASE LIVE MOUNTS USING CONTAINERS_

FIELD OF TECHNOLOGY

The present disclosure relates generally to database systems and data processing, and more specifically to database live mounts using containers.

BACKGROUND

A data management system may be employed to manage (e.g., process, backup, restore) data. The data may be generated, stored, or otherwise used by one or more computing systems, examples of which may include servers, databases, virtual machines, cloud computing systems, file systems (e.g., network-attached storage (NAS) systems), or other storage systems. As the quantity of data generated, stored, or otherwise used by various computing systems has increased, so too has the desire for improved data management systems and related techniques. For example, data management systems and related techniques that offer improved performance with respect to one or more performance metrics such as reliability, efficiency, scalability, or ease-of-use are desired.

DETAILED DESCRIPTION

Figure 1:
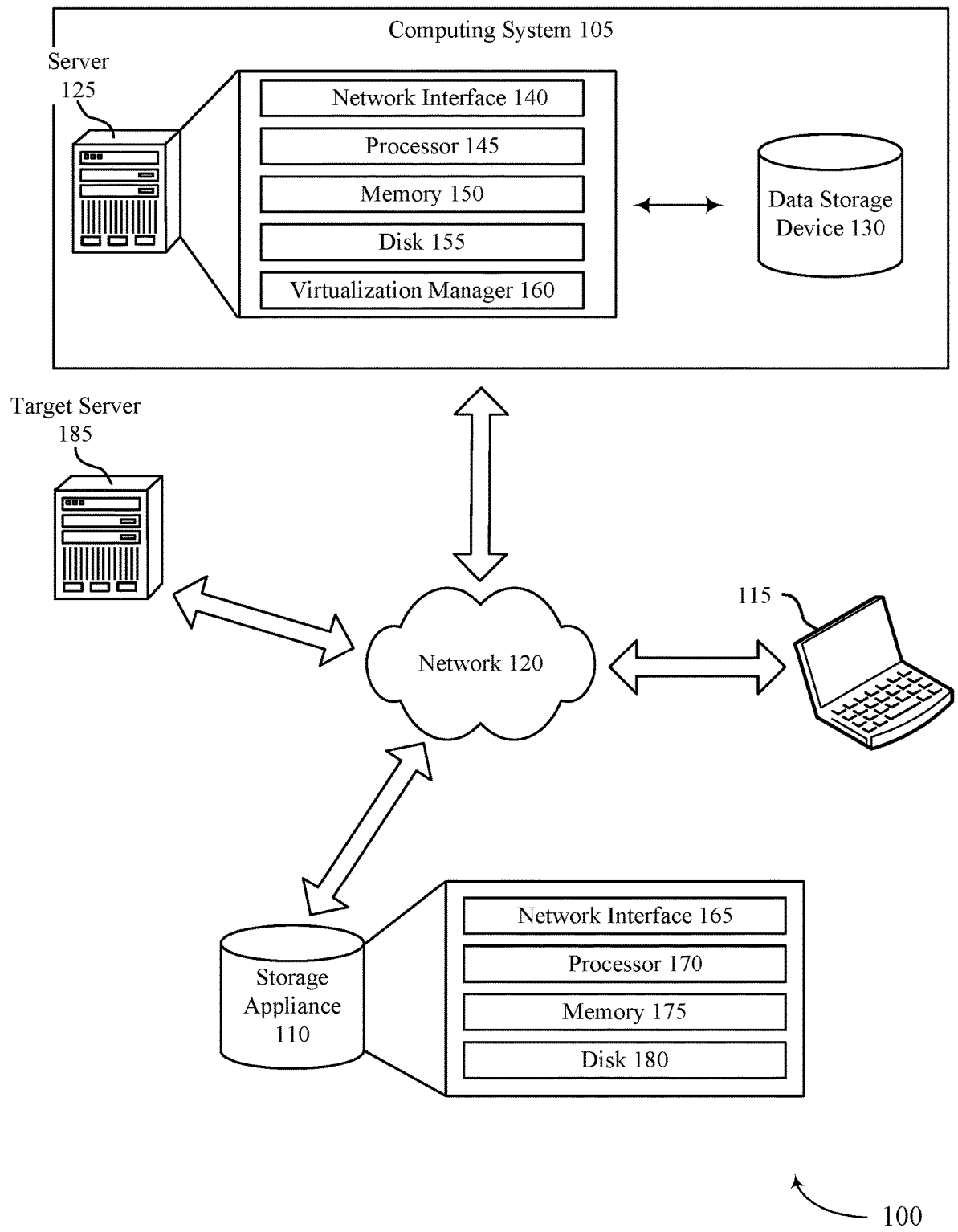
FIG. 1 shows an example of a computing environment that supports database live mounts using containers in accordance with examples as disclosed herein.

A backup system may support a service that enables customers to mount, at the backup system, data versions backed up at the backup system without the underlying data being transferred to customer systems. The service may further enable a customer system to access the underlying data located at the backup system to operate (e.g., access, update, query, etc.) a version of a database stored at the backup system while the underlying data remains located at the backup system. This service may be referred to as a "live-mount service." To operate a live-mounted database version, a customer may configure and provision computing resources (external from the backup system) that are used to run the processes for operating the live-mounted database version (e.g., processing and memory resources) and to access the underlying data located at the backup systems (e.g., networking resources).

Despite providing an effective service, a performance and stability of live-mounted database versions may be or become less than desirable. In some examples, a poor (e.g., slow, intermittent) network connection between the customer-configured computing resources and the backup system may increase a latency associated with accessing a live-mounted database version. Additionally, or alternatively, the poor network connection may decrease a stability of the live-mounted database version—e.g., as network failures may cause transactions to not be successfully committed to the live-mounted database version. And over time, the stability of the live-mounted database version may continue to degrade. Accordingly, the use of live-mounted database versions for extended periods of time may be discouraged.

Additionally, tasking the customer with the provisioning and configuring of separate resources to operate the live-mounted database version may introduce inefficiencies into the operation of the live-mounted database and may burden the customer with unwanted costs and complexity. For example, the customer may overprovision or underprovision the customer-configured computing resources for supporting the live-mounted database version.

To reduce (e.g., eliminate) the setup burden on the customer while improving and stabilizing a performance of live-mounted database versions, containers may be created at a backup system and used to host the processes for operating live-mounted database versions. Upon creation, a container may be configured with a database management software that is compatible with the database technology (e.g., Oracle, SQL) associated with the live-mounted database version. Additionally, upon creation, computing resources (e.g., processing and memory resources) at the storage appliance may be allocated to the container. The container may use the computing resources to run the database processes for accessing the data that underlies the live-mounted database version, where the underlying data remains located at the backup system (e.g., external to the container). In some examples, multiple versions of the database may be able to be reconstructed from the underlying data, and a user may be able to choose between the versions. To access the underlying data, the container may use communication protocols supported by the backup system.

FIG. 1 shows an example of a computing environment that supports database live mounts using containers in accordance with examples as disclosed herein.

The computing environment 100 may include the computing system 105, the storage appliance 110, and the computing device 115 in communication with each other via network 120 (which may include one or more networks). The computing environment 100 may also include one or more computing devices interconnected through the network 120. In some examples, the computing environment 100 may include other computing devices or other storage devices not shown. The other computing devices may include, for example, a mobile computing device, a non-mobile computing device, a server, a workstation, a laptop computer, a tablet computer, a desktop computer, or an information processing system. The other storage devices may include, for example, a storage area network storage device, a networked-attached storage device, a hard disk drive, a solid-state drive, or a data storage system.

The computing environment 100 may provide a cloud computing environment for one or more computing devices. Cloud computing may refer to Internet-based computing, wherein shared resources, software, and/or information may be provided to one or more computing devices on-demand via the Internet. The computing environment 100 may comprise a cloud computing environment providing Software-as-a-Service (SaaS) or Infrastructure-as-a-Service (IaaS) services. SaaS may refer to a software distribution model in which applications are hosted by a service provider and made available to end users over the Internet. In one example, the computing environment 100 may include a virtualized infrastructure that provides software, data processing, and/or data storage services to end users accessing the services via the computing environment 100. In one example, the computing environment 100 may provide cloud-based work productivity or business-related applications to a computing device, such as the computing device 115.

In some examples, the computing environment 100 may provide remote access to secure applications and files stored within the computing system 105 from a remote computing device, such as the computing device 115. The computing system 105 may use an access control application to manage remote access to protected resources, such as protected applications, databases, or files located within the computing system 105. To facilitate remote access to secure applications and files, a secure network connection may be established using a virtual private network (VPN). A VPN connection may allow a remote computing device, such as the computing device 115, to securely access data from a private network (e.g., from a company file server or mail server) using an unsecure public network or the Internet. The VPN connection may use client-side software (e.g., running on the remote computing device) to establish and maintain the VPN connection. The VPN client software may provide data encryption and encapsulation prior to the transmission of secure private network traffic through the Internet.

The computing device 115 may be a personal computing device, such as a stationary device (e.g., a desktop computer or access point) or a mobile device (e.g., a cellular phone, laptop, table, personal digital assistant). The computing device 115 may be a commercial computing device, such as a server or collection of servers. The computing device may be a virtual device, e.g., a virtual machine.

The computing system 105 may include one or more servers, such as the server 125, and one or more storage devices, such as the storage device 130, that are in communication with the one or more servers.

A server, such as the server 125, may allow a client to download information or files (e.g., executable, text, application, audio, image, or video files) from the server 125 or to perform a search query related to particular information stored on the server 125. In some examples, a server may act as an application server or a file server. In general, the server 125 may refer to a hardware device that acts as the host in a client-server relationship or a software process that shares a resource with or performs work for one or more clients. In some examples, the server 125 may be used to create and manage one or more virtual machines associated with a virtualized infrastructure. The one or more virtual machines may run various applications, such as a database application or a web server. The server 125 may include the network interface 140, the processor 145, the memory 150, the disk 155, and the virtualization manager 160 all in communication with each other.

The network interface 140 may enable the server 125 to connect to the network 120. The network interface 140 may include a wireless network interface and/or a wired network interface. The processor 145 may enable the server 125 to execute computer-readable instructions stored in the memory 150 in order to perform processes described herein. The processor 145 may include one or more processing units, such as one or more CPUs and/or one or more GPUs. The memory 150 may comprise one or more types of memory (e.g., RAM, SRAM, DRAM, ROM, EEPROM, Flash, etc.). The disk 155 may include a hard disk drive and/or a solid-state drive. The memory 150 and the disk 155 may comprise hardware storage devices.

The virtualization manager 160 may manage a virtualized infrastructure and perform management operations associated with the virtualized infrastructure. The virtualization manager 160 may manage the provisioning of virtual machines running within the virtualized infrastructure and provide an interface to computing devices interacting with the virtualized infrastructure. In one example, the virtualization manager 160 may set a virtual machine having a virtual disk into a frozen state in response to a snapshot request made via an application programming interface (API) by a storage appliance, such as a storage appliance within the computing system 105 or the storage appliance 110. Setting the virtual machine into a frozen state may allow a point-in-time snapshot of the virtual machine to be stored or transferred. In one example, updates made to a virtual machine that has been set into a frozen state may be written to a separate file (e.g., an update file) while the virtual disk may be set into a read-only state to prevent modifications to the virtual disk file while the virtual machine is in the frozen state.

The virtualization manager 160 may then transfer data associated with the virtual machine (e.g., an image of the virtual machine or a portion of the image of the virtual disk file associated with the state of the virtual disk at the point in time it is frozen) to a storage appliance (for example, a storage appliance within the computing system 105 or the storage appliance 110, described further below) in response to a request made by the storage appliance. After the data associated with the point-in-time snapshot of the virtual machine has been transferred to the storage appliance, the virtual machine may be released from the frozen state (i.e., unfrozen) and the updates made to the virtual machine and stored in the separate file may be merged into the virtual disk file. The virtualization manager 160 may perform various virtual machine-related tasks, such as cloning virtual machines, creating new virtual machines, monitoring the state of virtual machines, moving virtual machines between physical hosts for load balancing purposes, and facilitating backups of virtual machines.

The storage device 130 may include one or more hardware storage devices for storing data, such as a hard disk drive (HDD), a magnetic tape drive, a solid-state drive (SSD), a storage area network (SAN) storage device, or a Network-Attached Storage (NAS) device. In some cases, a computing system, such as the computing system 105, may include multiple servers and/or data storage devices in communication with each other. The one or more data storage devices may comprise a tiered data storage infrastructure (or a portion of a tiered data storage infrastructure). The tiered data storage infrastructure may allow for the movement of data across different tiers of a data storage infrastructure between higher-cost, higher-performance storage devices (e.g., solid-state drives and hard disk drives) and relatively lower-cost, lower-performance storage devices (e.g., magnetic tape drives).

In some examples, the computing system 105 includes a storage appliance (e.g., the storage appliance 110) that includes a data management system for backing up virtual machines or files within a virtualized infrastructure. A storage appliance within computing system may be configured similar to the storage appliance 110. In some examples, a storage appliance in computing system is an extension of the storage appliance 110. For example, a storage appliance in computing system may be an agent for the storage appliance 110, where the agent may be implemented as software (e.g., installed at the server 125 or at a central server) or as hardware in the computing system 105. When implemented as hardware, the server 125 and the storage appliance 110 may be in communication with each other via a networking fabric connecting servers and data storage units within the computing system 105 to each other.

The network 120 may allow computing devices or storage devices to connect to and communicate with other computing devices or other storage devices in the computing environment 100. The network 120 may include a secure network such as an enterprise private network, an unsecure network such as a wireless open network, a local area network (LAN), a wide area network (WAN), and the Internet. The network 120 may include a cellular network, a mobile network, a wireless network, or a wired network. Each network of the network 120 may include hubs, bridges, routers, switches, and wired transmission media such as a direct-wired connection. The network 120 may include an extranet or other private network for securely sharing information or providing controlled access to applications or files.

The storage appliance 110 may comprise a cloud-based data management system for backing up virtual machines and/or files within a virtualized infrastructure, such as virtual machines running on the server 125 or files stored on the server 125. The storage appliance 110 may include multiple machines, and the multiple machines may comprise multiple nodes of a server cluster. The server cluster may comprise a set of physical machines that are connected together via a network. The server cluster may be used for storing data associated with a plurality of virtual machines, such as backup data associated with different point-in-time versions of the virtual machines. The storage appliance 110 may include the network interface 165, the processor 170, the memory 175, and the disk 180, which may be configured similarly as the corresponding components of the server 125.

In some examples, the storage appliance 110 may manage the extraction and storage of virtual machine snapshots associated with different point-in-time versions of one or more virtual machines running within the computing system 105. A snapshot of a virtual machine may correspond with a state of the virtual machine at a particular point-in-time. In some examples, a snapshot of a virtual machine captures a state of a file system as well as data changes (e.g., additions, updates, renaming, and/or deletions of data) that occurred between snapshots. A snapshot may be used to restore a virtual machine to a particular instance of time.

In response to a restore command from the storage device 130, the storage appliance 110 may restore a point-in-time version of a virtual machine or restore point-in-time versions of one or more files located on the virtual machine and transmit the restored data to the server 125. In response to a mount command from the server 125, the storage appliance 110 may allow a point-in-time version of a virtual machine to be mounted and allow the server 125 to read and/or modify data associated with the point-in-time version of the virtual machine. To improve storage density, the storage appliance 110 may deduplicate and compress data associated with different versions of a virtual machine and/or deduplicate and compress data associated with different virtual machines. To improve system performance, the storage appliance 110 may first store virtual machine snapshots received from a virtualized environment in a cache, such as a flash-based cache. The cache may also store popular data or frequently accessed data (e.g., based on a history of virtual machine restorations, incremental files associated with commonly restored virtual machine versions) and current day incremental files or incremental files corresponding with snapshots captured within the past 24 hours.

An incremental file may comprise a forward incremental file or a reverse incremental file. A forward incremental file may include a set of data representing changes that have occurred since an earlier point-in-time snapshot of a virtual machine. To generate a snapshot of the virtual machine corresponding with a forward incremental file, the forward incremental file may be combined with an earlier point-in-time snapshot of the virtual machine (e.g., the forward incremental file may be combined with the last full image of the virtual machine that was captured before the forward incremental file was captured and any other forward incremental files that were captured subsequent to the last full image and prior to the forward incremental file). A reverse incremental file may include a set of data representing changes from a later point-in-time snapshot of a virtual machine. To generate a snapshot of the virtual machine corresponding with a reverse incremental file, the reverse incremental file may be combined with a later point-in-time snapshot of the virtual machine (e.g., the reverse incremental file may be combined with the most recent snapshot of the virtual machine and any other reverse incremental files that were captured prior to the most recent snapshot and subsequent to the reverse incremental file).

The storage appliance 110 may provide a user interface (e.g., a web-based interface or a graphical user interface) that displays virtual machine backup information such as identifications of the virtual machines protected and the historical versions or time machine views for each of the virtual machines protected. A time machine view of a virtual machine may include snapshots of the virtual machine over a plurality of points in time. Each snapshot may comprise the state of the virtual machine at a particular point in time. Each snapshot may correspond with a different version of the virtual machine (e.g., Version 1 of a virtual machine may correspond with the state of the virtual machine at a first point in time and Version 2 of the virtual machine may correspond with the state of the virtual machine at a second point in time subsequent to the first point in time).

The user interface may enable an end user of the storage appliance 110 (e.g., a system administrator or a virtualization administrator) to select a particular version of a virtual machine to be restored or mounted. When a particular version of a virtual machine has been mounted, the particular version may be accessed by a client (e.g., a virtual machine, a physical machine, or a computing device) as if the particular version was local to the client. A mounted version of a virtual machine may correspond with a mount point directory (e.g., /snapshots/VM5Nersion23). In one example, the storage appliance 110 may run a Network File System (NFS) server and make the particular version (or a copy of the particular version) of the virtual machine accessible for reading and/or writing. The end user of the storage appliance 110 may then select the particular version to be mounted and run an application (e.g., a data analytics application) using the mounted version of the virtual machine. In another example, the particular version may be mounted as an Internet Small Computer Systems Interface (iSCSI) target.

In some examples, the storage appliance 110 is located within the computing system 105. In some examples, a storage appliance within the computing system 105 may similarly perform (e.g., instead of or in combination with the storage appliance 110) the operations and functions described with reference to the storage appliance 110.

As described herein, the storage appliance 110 may be configured to backup information at the computing system 105. In some examples, the storage appliance 110 may be used to back up a database (e.g., an Oracle database, SQL database) hosted at the computing system 105. The storage appliance 110 may store multiple prior versions of the database corresponding to the database at different points in time. The storage appliance 110 may be configured to restore a version of the database to the computing system 105, which may include adding to, deleting, or overwriting portions of the database hosted at the computing system 105.

A customer may desire to restore a version of a database without overwriting a working version of the database at the computing system 105. For example, the customer may wish to run multiple versions of the database in parallel so that users may be directed to a different version of the database while maintenance is performed on the database at the computing system. Additionally, or alternatively, the customer may wish to run multiple versions of the database in parallel so that analytics may be performed on a version of the database without compromising a performance of the working version of the database at the computing system 105. In addition to the foregoing examples, a customer may have additional reasons for running multiple version of the database. In some examples, the customer may further desire to restore the version of the database without transferring the full set of data from the storage appliance 110—e.g., to preserve network performance and/or storage capacity at the computing system 105.

To support these goals, the storage appliance 110 may offer a live mount service that enables the customer to remotely mount the version of a database based on accessing the data stored at the storage appliance 110 via a network connection. That is, the storage appliance 110 may give the customer the capability of accessing and modifying the data for a version of the database using the corresponding backup data stored at the storage appliance 110. In some examples, the corresponding backup data may be stored in accordance with and accessible using a software-defined file system (SDFS).

To configure a live-mounted database at the storage appliance 110, the customer may provision separate computing resources (e.g., processing resources, memory resources, network resources, etc.) that are used to run the processes for operating the live-mounted database via a networked connection. For example, the customer may provision a separate server, such as the target server 185. The target server 185 may include one or more processing cores, memory (e.g., RAM), one or more network cards, etc. The target server 185 may be located on-premises (e.g., within the computing system 105) or off-premises (e.g., external to computing system 105). In some examples, the target server 185 may be implemented with server 125. The customer may further configure the separate computing resources to support database management operations. For example, the customer may configure target server 185 to operate a database of a certain type (e.g., an Oracle database, an SQL database), which may include installing database management software on the separate resources.

After provisioning and configuring the separate computing resources, the separate computing resources may be used to access (e.g., read, write, modify) the data for the live-mounted version of the database that remains stored at the storage appliance 110. To access the data, the separate computing resources may use a network protocol that is compatible with the database management software installed at the separate computing resources—e.g., a network file system (NFS) protocol if the database is an Oracle database, a server message block (SMB) protocol if the database is an SQL database.

Despite providing an effective service, a performance and stability of live-mounted database versions may be or become less than desirable. In some examples, a poor (e.g., slow, intermittent) network connection between the target server 185 and the storage appliance 110 may increase a latency associated with accessing a live-mounted database version. Additionally, or alternatively, the poor network connection may decrease a stability of the live-mounted database version—e.g., as network failures may cause transactions to not be successfully committed to the live-mounted database version. And over time, the stability of the live-mounted database version may continue to degrade. Accordingly, the use of live-mounted database versions for extended periods of time may be discouraged.

Additionally, tasking the customer with the provisioning and configuring of separate resources to operate the live-mounted database version may introduce inefficiencies into the operation of the live-mounted database and may burden the customer with unwanted costs and complexity. For example, during an initial setup, the customer may overprovision or underprovision the target server 185 for supporting the live-mounted database version. Also, dynamic provisioning of the target server 185 based on changing processing needs of the live-mounted database version may not be available. Additionally, the customer may be required to purchase or lease the separate resources and/or to hire or retain employees or contractors to configure the separate resources.

To reduce (e.g., eliminate) the setup burden on the customer while improving and stabilizing a performance of live-mounted database versions, containers may be created at a backup system (e.g., the storage appliance 110) and used to host the processes for operating live-mounted database versions. Upon creation, a container may be configured with a database management software that is compatible with the database technology (e.g., Oracle, SQL) associated with the live-mounted database version. Additionally, upon creation, computing resources (e.g., processing and memory resources) at the storage appliance may be allocated to the container. The container may use the computing resources to run the database processes for accessing the data that underlies the live-mounted database version, where the underlying data is stored at the backup system (e.g., external to the container). In some examples, multiple versions of the database may be able to be reconstructed from the underlying data (e.g., a user may be able to choose between the versions). To access the underlying data, the container may use communication protocols supported by the backup system.

In some examples, the storage appliance 110 may receive a request to mount a version of a database based on data that is stored at the storage appliance 110 for the database. Based on receiving the request, the storage appliance 110 may create a container from an image that is associated with a database management software corresponding to the database. Accordingly, upon creation, the container may be configured with the database management software for running processes for accessing and modifying the version of the database. Additionally, upon creation, computing resources (e.g., processing resources, memory resources, network resources, etc.) at the storage appliance 110 may be allocated to the container. In some examples, the computing resource allocated to the container may be based on properties (e.g., a size, complexity, etc.) of the version of the database stored at the storage appliance 110, a request from the customer, a default allocation, etc.

After the container is created, the container may receive a request to access or modify the version of the database. The request may be a database query or a database command (e.g., an insert, delete, or modify command, among other options. In response to the request, the container may access data for the version of the database that is stored at the storage appliance 110—e.g., to read, write, or modify the data of the version of the database. The data for the version of the database may be stored external to the container, and the container may access the data using network protocols supported by the storage appliance 110. Based on accessing the version of the database, the container may output (e.g., to the device that sent the request) a response to the request (e.g., data read from the version of the database, an acknowledgment that data has been written to the version of the database, a result of a requested computation using values of the database, etc.).

By using containers to provision and configure separate resources at a backup system to manage a live-mounted database version, costs (e.g., monetary and time expenditures) and complexity associated with using and maintaining live-mounted database versions may be reduced for customers. Additionally, since the computing resources may be allocated to a container by the backup system, computing resources for operating live-mounted database versions may be more efficiently (and, in some examples, dynamically) allocated.

Also, by using internal containers to manage the live-mounted database version, performance and stability issues (e.g., caused by poor network connectivity) associated with live-mounted database versions may be avoided and a reliability of the live-mounted database versions may be increased. Accordingly, the use of live-mounted database versions for extended durations (which may be referred to as always-on live mounts) may be supported. Always-on live mounts may be used to support additional services that would otherwise be unavailable to a customer, such as continuous verification, malware detection, and content analysis of backup data.

Figure 2:
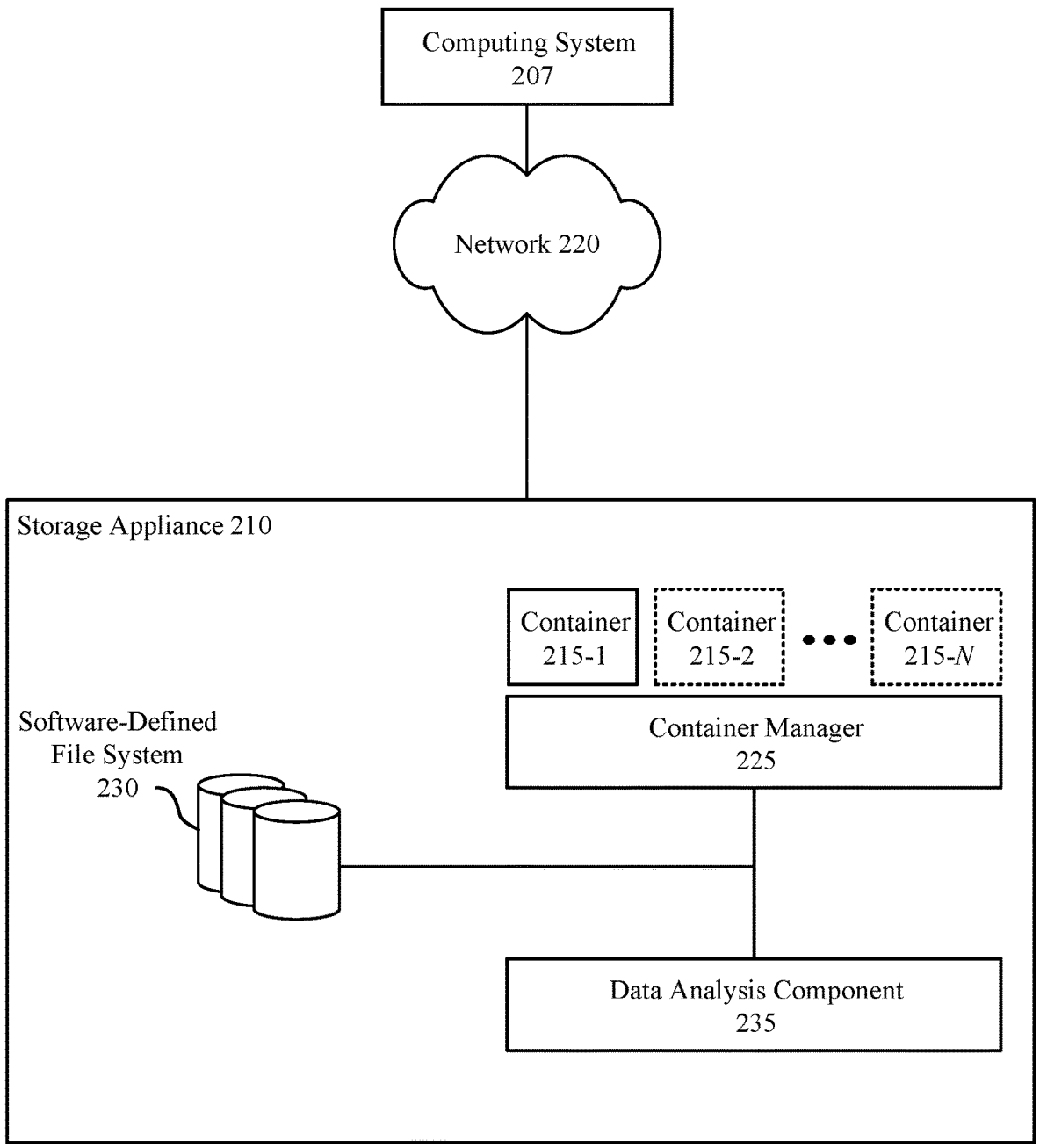
FIG. 2 shows an example of a subsystem that supports database live mounts using containers in accordance with examples as disclosed herein.

FIG. 2 shows an example of a subsystem that supports database live mounts using containers in accordance with examples as disclosed herein.

The subsystem 200 may include the network 220 and the storage appliance 210, which may be respective examples of a network or a storage appliance described herein, including with reference to FIG. 1. The subsystem 200 may also include the computing system 207, which may be an example of a computing system or computing device described herein, including with reference to FIG. 1. The computing system 207 may be managed by a customer that stores data at the storage appliance 210.

The storage appliance 210 may include the SDFS 230, the container manager 225, one or more containers (e.g., the first container 215-1, the second container 215-2, through the Nth container 215-N), and the data analysis component 235. The SDFS 230 may be configured to organize and manage backup data stored at the storage appliance 210. The SDFS 230 may provide a file management system that indexes the backup data such that versions of a computing object (e.g., a virtual machine, database, file system, etc.) may be restored to a point-in-time. For example, the SDFS 230 may be configured to organize and manage backup data for a database of the computing system 207 that is stored at the storage appliance 210 and to restore requested versions of the database.

The container manager 225 may be configured to manage the operations of one or more containers running at the storage appliance 210. The container manager 225 may be configured to create, start, stop, and delete containers (e.g., the first container 215-1 through the Nth container 215-N). To create a container, the container manager 225 may use an image that stores code for an application that is captured by the image. In some examples, the container manager 225 may be configured to create a container based on receiving a request (e.g., from computing system 207) to establish a live mount of a version of the database of the computing system 207. As described herein, a live mount of a version of a database may relate to a version of the database that is accessible at the storage appliance 210 without the version of the database being restored to the computing system 207. That is, a live mount service may enable a version of the database to be operated (e.g., initialized, updated, accessed, etc.) using data located at the storage appliance 210—e.g., instead of restoring the data underlying the version of the database to the computing system 207.

Based on receiving the request, the container manager 225 may be configured to identify the image for creating the container based on a type of the database of the computing system 207. For example, the container manager 225 may use an Oracle image if the database is an Oracle database or an SQL image if the database is an SQL database. The container manager 225 may be configured to create each container in a sandboxed environment and to store information for the containers in sandboxed memory locations of the storage appliance 210.

The container manager 225 may further be configured to allocate computing resources (e.g., processing, memory, networking resources) of the storage appliance 210 to the containers. When creating a container for a live mount service, the container manager 225 may be configured to allocate computing resources to the container based on characteristics of the version of the database to be live mounted—e.g., a size of the database, a quantity of tables in the database, a size of the tables in the database, a type of data stored in the database, a purpose of the database, a technology used by the database, etc.

After being created, a container (e.g., the first container 215-1) may run the processes that support the operation of the application captured by a corresponding image. For example, if the image is for an Oracle database, the container may run the processes used to support the operation of an Oracle database—e.g., including background processes for managing the database, processes for handling requests to access (e.g., queries, write commands, read commands, etc.) the database, processes for accessing the database, etc. In some examples, if the image is for an Oracle database, the container may use an NFS communication protocol to receive database requests and to output results. Similarly, if the image is for an SQL database, the container may run the processes uses to support the operation of an SQL database (e.g., including using an SMB communication protocol for database messaging).

The application running in the container may be configured to access data that is external to the container (e.g., data in the storage appliance 210 or external to the storage appliance 210). To access external information, the container may communicate with an external component (e.g., the storage appliance) through ports at the container using a communication protocol (e.g., TCP, UDP, SMB, NFS, FTP, etc.) configured for a respective port. Accordingly, for a live mount service, the container may be configured to solely run the processes for managing a version of the database (e.g., handling database requests received from the computing system 207, adding, updating, or deleting entries in the version of the database, etc.) while the data for the version of the database may be stored external to the container—e.g., at the storage appliance 210 using the SDFS 230. In some examples, however, the data for the version of the database may also be stored in the container.

The data analysis component 235 may use a container to perform data management services. When a container (e.g., the first container 215-1) is created to support a live mount service, the data analysis component 235 may use the container (or a different container) to analyze the backup data underlying the version of the database being supported by the container.

In some examples, the data analysis component 235 may use the container to verify an integrity of the backup data. For example, the data analysis component 235 may use the container to access native data of the version of the database and may use the native data to perform checksum operations—e.g., because, in some examples, data verification techniques may not be supported for backup data while it is in a backup format. The data analysis component 235 may additionally use the native data to ensure that the integrity of the version (e.g., transactional consistency) of the database has been maintained. Additionally, or alternatively, the data analysis component 235 may use the container to scan the native data for malware. Additionally, or alternatively, the data analysis component 235 may use the container to analyze the content of the database—e.g., to determine types of data in the database and the amounts of the types of data in the database.

Figure 3:
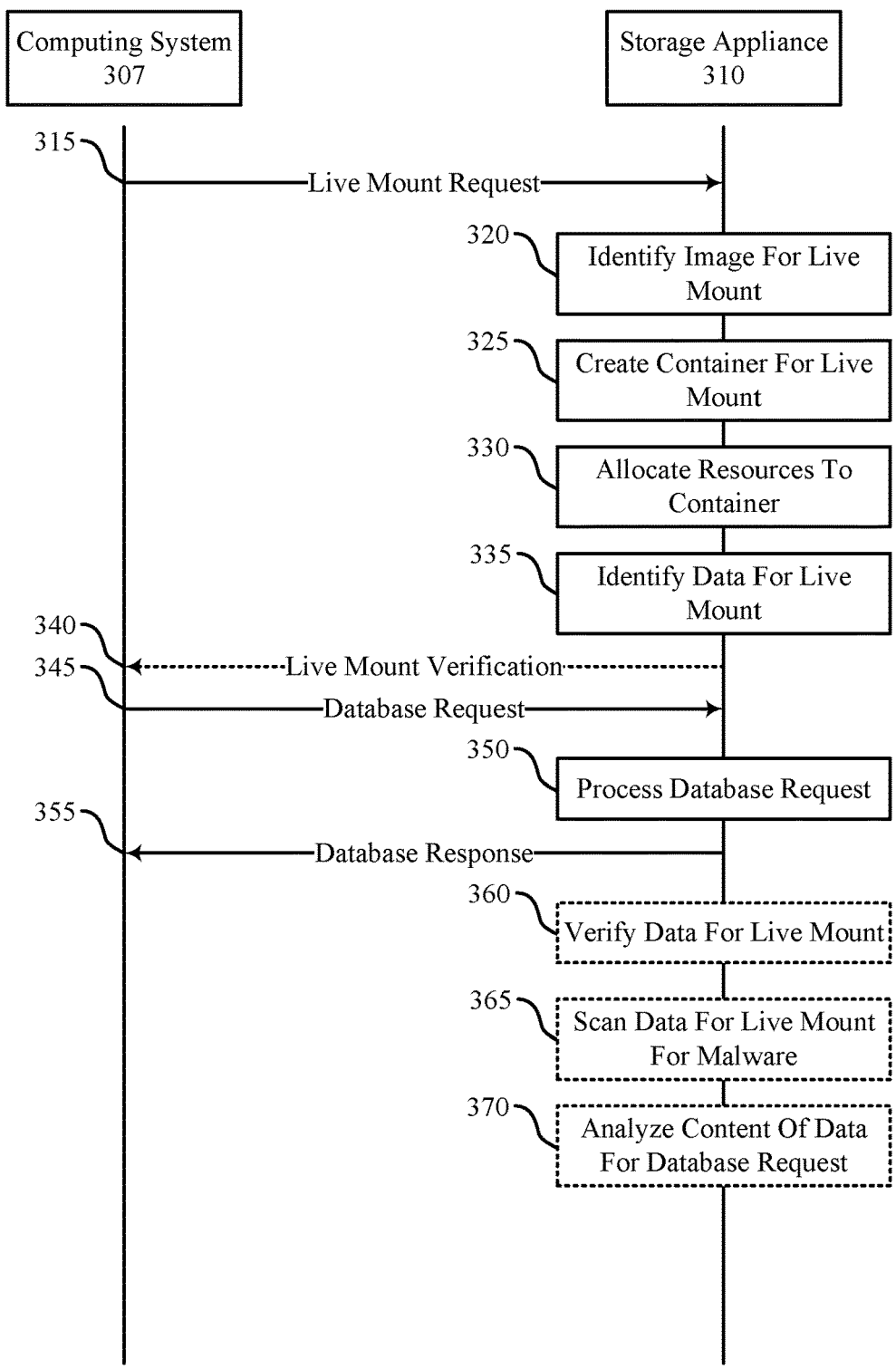
FIG. 3 shows an example of a set of operations that supports database live mounts using containers in accordance with examples as disclosed herein.

FIG. 3 shows an example of a set of operations that supports database live mounts using containers in accordance with examples as disclosed herein.

The process flow 300 may be performed by the computing system 307 and the storage appliance 310, which may be respective examples of a computing system and storage appliance described herein. In some examples, the process flow 300 illustrates an example set of operations performed to support database live mounts using containers. For example, process flow 300 may include operations for creating a container used to manage a database live mount.

Aspects of the process flow 300 may be implemented by a controller, among other components. Additionally, or alternatively, aspects of the process flow 300 may be implemented as instructions stored in memory (e.g., firmware stored in a memory coupled with a controller). For example, the instructions, when executed by a controller, may cause the controller to perform the operations of the process flow 300.

One or more of the operations described in the process flow 300 may be performed earlier or later, omitted, replaced, supplemented, or combined with another operation. Also, additional operations described herein may replace, supplement or be combined with one or more of the operations described in the process flow 300.

At 315, a request to establish a live mount of a database may be received (e.g., at the storage appliance 310). The live mount request may be sent by a customer at the computing system 307. As described herein, the live mount request may cause the storage appliance 310 to rebuild, at the storage appliance 310, a version of the database (e.g., data and transaction logs) that can be accessed remotely by the computing system and without transferring the version of the database to the computing system 307. The live mount request may further cause the storage appliance 310 to initialize and maintain the version of the database in an operating mode such that the storage appliance 310 may query and update the version of the database.

By contrast, a restore request may be sent by a customer to restore a version of the database to the computing system 307. Restoring the version of the database may include transferring the database information to the computing system 307.

At 320, an image for mounting the requested version of the database may be identified (e.g., by a container manager at storage appliance 310). The image may be identified based on a technology used for the version of the database. For example, if the database is an Oracle database, an image storing code for an Oracle database management application may be identified. Or, if the database is an SQL database, an image storing code for an SQL database management application may be identified. In some examples, a particular release version of the technology may be identified based on a release version of the database management software used to manage the version of the database. In some examples, the live mount request may include an indication of the technology, release version, or both, used by the requested version of the database. Additionally, or alternatively, the container manager may determine the technology and release version used by the version of the database—e.g., based on information stored in the storage appliance 310 for the corresponding database of the computing system 307.

In some examples, the image may be selected from a set of images downloaded to the container manager—e.g., the image matching the database technology and release version may be selected. Additionally, or alternatively, the image may be identified based on searching a repository (e.g., an online repository) for the database technology and release version of the database management software used by the requested version of the database. The identified image may then be downloaded from the repository.

At 325, a container to run an application for managing the requested version of the database may be created (e.g., by the container manager). The container may be created using the identified image. The container may provide a sandboxed environment for running the application for managing the requested version of the database. In some examples, the container may communicate with other component within the storage appliance (e.g., an SDFS in the storage appliance 310, networking components, etc.) via one or more ports and using one or more communication protocols.

The application running in the container may support the execution of the processes for managing the operation of the requested version of the database as well as the handling of requests (e.g., write requests, read requests, queries) to access the requested version of the database.

At 330, computing resources of the storage appliance 310 may be allocated to the container (e.g., by the container manager). Among other computing resources, the computing resources may include processing resources (e.g., one or more processing cores or units), memory resources (e.g., RAM, disk space, etc.), networking resources (e.g., one or more network cards), or any combination thereof.

In some examples, the amount of resources allocated to the container may be based on characteristics of the requested version of the database (e.g., as determined by the container manager). For example, the amount of resources allocated to the container may be based on a size of the database, a quantity of tables included in the database, a size of the tables include in the database, a type of data included in the database, a technology used by the database, an expected access frequency of the database, etc. For example, an first amount of resources may be allocated to the container if the version of the database has a first size, and a second (e.g., larger) amount of resources may be allocated to the container if the version of the database has a second (e.g. larger) size. In some examples, the allocation of computing resources to the container may change over time—e.g., if the size of the database grows to exceed a threshold, if a rate of access requests exceeds a threshold, etc. By changing the resource allocation based on current characteristics of the version of the database, computing resources of the storage appliance 310 may be more efficiently allocated to containers.

Additionally, or alternatively, the amount of resources allocated to the container may be based on a request received from the computing system 307. For example, if the live mount requests includes a request for a certain amount of computing resources, the container manager may allocate the requested amount of computing resources to the container (e.g., up to a limit agreed to in an SLA). In another example, if the live mount requests includes a request for a certain amount of computing resources, the container manager may take the resource request into account when allocating the amount of computing resources to the container. That is, the container manager may allocate the requested amount or a different amount to the container (e.g., a lesser amount if the amount of available computing resources is below a threshold).

At 335, data for the requested version of the database may be identified at the storage appliance 310. The data for the requested version of the database may include database values and transaction logs. The data may be stored using a software-defined file system at the storage appliance 310. In some examples, the data may be stored in accordance with a backup format. The software-defined file system may be configured to translate a request to access data of the requested version of the database to instructions for accessing the data in the software-defined file system, where the request may be received from the container. Additionally, or alternatively, the data may be stored in accordance with a native format and a request from the container may be used to directly access the data in the software-defined file system. In some examples, the data may be stored on a disk at the storage appliance 310 that is isolated from a disk (or portion of the disk) used to support the operation of the container. In some examples, the storage appliance 310 may include data for multiple versions of the database. The storage appliance 310 may use the data corresponding to the requested version of the database to rebuild the requested version of the database.

At 340, a message verifying that the requested version of the database has been mounted at the storage appliance 310 may be received at the computing system 307.

At 345, a request to access the live-mounted version of the database may be transmitted to the storage appliance 310. The request may include a request to insert a row into the live-mounted version of the database, delete a row from the live-mounted version of the database, add a row to the live-mounted version of the database, or any combination thereof. In some examples, the request may include a query regarding the live-mounted version of the database. For example, the query may request the value of a particular row and column of a table in the live-mounted version of the database. In another example, the query may request the result of processing information in the database—e.g., the result of adding a value of a first row and column of a table with the value of another row and column of the table or of a different table. In some examples, the request includes insert commands, delete commands, query commands, modify commands, or any combination thereof, for posting a transaction to the live-mounted version of the database.

At 350, the application running in the container may be used to process the database request. In some examples, the database request may be forwarded to the container via the container manager (e.g., based on an internal or external IP address assigned to the container). If the database request is a read request, the application running in the container may read a requested portion of one or more tables in the live-mounted version of the database. To read the requested portion of the live-mounted version of the database, the application may process the request and send database commands to the SDFS to access the portion of the live-mounted version of the database stored in the SDFS. In response, the SDFS may send a message to the container including the data stored at the request portion of the database.

If the database request is a write request, the application running in the container may write to a requested portion of one or more tables in the live-mounted version of the database. To write to the requested portion of the live-mounted version of the database, the application may process the request and send database commands to the SDFS to access the portion of the live-mounted version of the database stored in the SDFS. In response, the SDFS may send a message to the container indicating that the write was successfully completed. In some examples, the write request is used to modify existing data at the live-mounted version of the database or to add data to the live-mounted version of the database.

If the database request is a query that request a computation be performed, the application running in the container read relevant portions of one or more tables in the live-mounted version of the live-mounted version of the database. After reading the relevant portions, the container may perform the requested computation. In some examples, the database request also includes a request to write the result of the computation to another portion of the live-mounted version of the database, and the application may write the result of the computation to the other portion of the live-mounted version of the database as similarly described above.

At 355, a database response to the database request may be received at the computing system. In some examples, the database response includes a result of reading a requested portion of the live-mounted version of the database. In some examples, the database response includes an indication that data received from the computing system 307 has been written to the requested portion of the live-mounted version of the database. In some examples, the database response includes a result of performing a computation using values stored at indicated portions of the live-mounted version of the database.

In some examples, the operations described at 315 through 340 may be repeated to create multiple containers for operating multiple live-mounted versions of one or more databases. In some examples, after a database is live-mounted in a container, another request may be received from the computing system 307 requesting that a different version of the database be reconstructed in the container. That is, while the container is being used to live-mount a database, a customer may send a subsequent request that cause the container to host a different live-mounted versions of the database. Also, once a container is created and a version of the database is live-mounted, the operations described at 345 through 355 may be repeated for each database request received from computing system 307.

As described herein, configuring and provisioning containers at the storage appliance to run applications for operating live-mounted versions of one or more databases, may reduce complexity for the customer, increase operational efficiency, and maintain an integrity of the live-mounted versions of the one or more databases. Accordingly, live-mounted versions of databases may be operated for extended periods of time (e.g., weeks, months, or years) with high performance and confidence. A live mounted version of a database that is operated for extended periods of time may be referred to as an always-on live mount. As also described herein, always-on live mounts may enable the storage appliance 310 to offer additional data analysis services that may otherwise be unavailable to a customer that uses the storage appliance 310 as a backup system.

At 360, a continuous data verification operation may be performed for the data associated with the live-mounted version of the database. Continuous data verification operations may include confirming that transactions performed on the live-mounted version of the database were successfully completed before being committed to the live-mounted version of the database. Continuous data verification operations may also include ensuring that the backup data stored for the live-mounted version of the database is accurate—e.g., by using the live-mount container to access the native data and/or metadata of the live-mounted version of the database and performing checksum operations to verify the integrity of the native data.

At 365, a malware detection operation may be performed to determine whether the data of the live-mounted version of the database includes malware. The malware detection operation may use the live-mount container to access the native data and/or metadata of the live-mounted version of the database and to analyze the native data to detect the presence of malware.

At 370, a content analysis operation may be performed to analyze the data of the live-mounted version of the database. For example, the content analysis may be used to determine types of data in the live-mounted version of the database, the types of data stored in the live-mounted version of the database, the quantity of tables in the live-mounted version of the database, and the like. In some examples, the content analysis operation may perform such content analysis on a per table basis of the live-mounted version of the database. As similarly described above, the content analysis operation may use the live-mount container to access the native data and/or metadata of the live-mounted version of the database. In some examples, the container manager may use a result of the content analysis when determining an amount of computing resources to allocate to the container used to operate the live-mounted version of the database.

In some examples, the above data analysis operations may be unable to be performed on backup data stored for the database of the computing system 307 while the backup data remains in a backup format.

Figure 4:
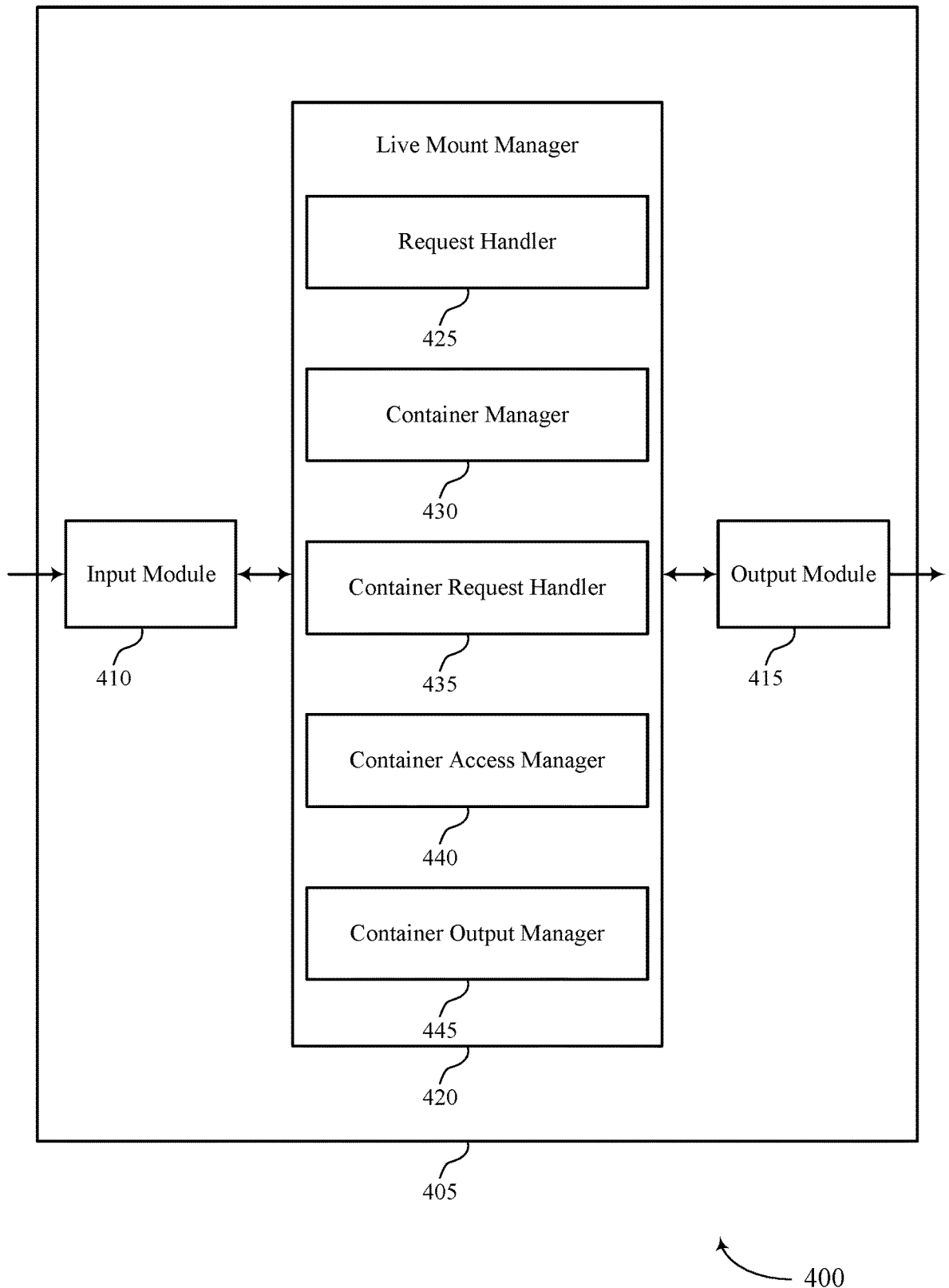
FIG. 4 shows a block diagram of an apparatus that supports database live mounts using containers in accordance with examples as disclosed herein.

FIG. 4 shows a block diagram 400 of a device 405 that supports database live mounts using containers in accordance with examples as disclosed herein. The device 405 may include an input module 410, an output module 415, and a live mount manager 420. The device 405 may also include a processor. Each of these components may be in communication with one another (e.g., via one or more buses).

The input module 410 may manage input signals for the device 405. For example, the input module 410 may identify input signals based on an interaction with a modem, a keyboard, a mouse, a touchscreen, or a similar device. These input signals may be associated with user input or processing at other components or devices. In some cases, the input module 410 may utilize an operating system such as iOS®, ANDROID®, MS-DOS®, MS-WINDOWS®, OS/2®, UNIX®, LINUX®, or another known operating system to handle input signals. The input module 410 may send aspects of these input signals to other components of the device 405 for processing. For example, the input module 410 may transmit input signals to the live mount manager 420 to support database live mounts using containers. In some cases, the input module 410 may be a component of an I/O controller 610 as described with reference to FIG. 6.

The output module 415 may manage output signals for the device 405. For example, the output module 415 may receive signals from other components of the device 405, such as the live mount manager 420, and may transmit these signals to other components or devices. In some examples, the output module 415 may transmit output signals for display in a user interface, for storage in a database or data store, for further processing at a server or server cluster, or for any other processes at any number of devices or systems. In some cases, the output module 415 may be a component of an I/O controller 610 as described with reference to FIG. 6.

For example, the live mount manager 420 may include a request handler 425, a container manager 430, a container request handler 435, a container access manager 440, a container output manager 445, or any combination thereof. In some examples, the live mount manager 420, or various components thereof, may be configured to perform various operations (e.g., receiving, monitoring, transmitting) using or otherwise in cooperation with the input module 410, the output module 415, or both. For example, the live mount manager 420 may receive information from the input module 410, send information to the output module 415, or be integrated in combination with the input module 410, the output module 415, or both to receive information, transmit information, or perform various other operations as described herein.

The request handler 425 may be configured as or otherwise support a means for receiving a request to mount a version of a database based on data that is stored at the computing system for the database. The container manager 430 may be configured as or otherwise support a means for creating a container at the computing system in response to the request to mount the version of the database, where the container is configured to support operating the version of the database. The container request handler 435 may be configured as or otherwise support a means for receiving, at the container, a database request associated with the version of the database. The container access manager 440 may be configured as or otherwise support a means for accessing, by the container and based on the database request, a set of data stored at the computing system and associated with the version of the database. The container output manager 445 may be configured as or otherwise support a means for outputting, by the container, a response to the database request based on accessing the set of data.

Figure 5:
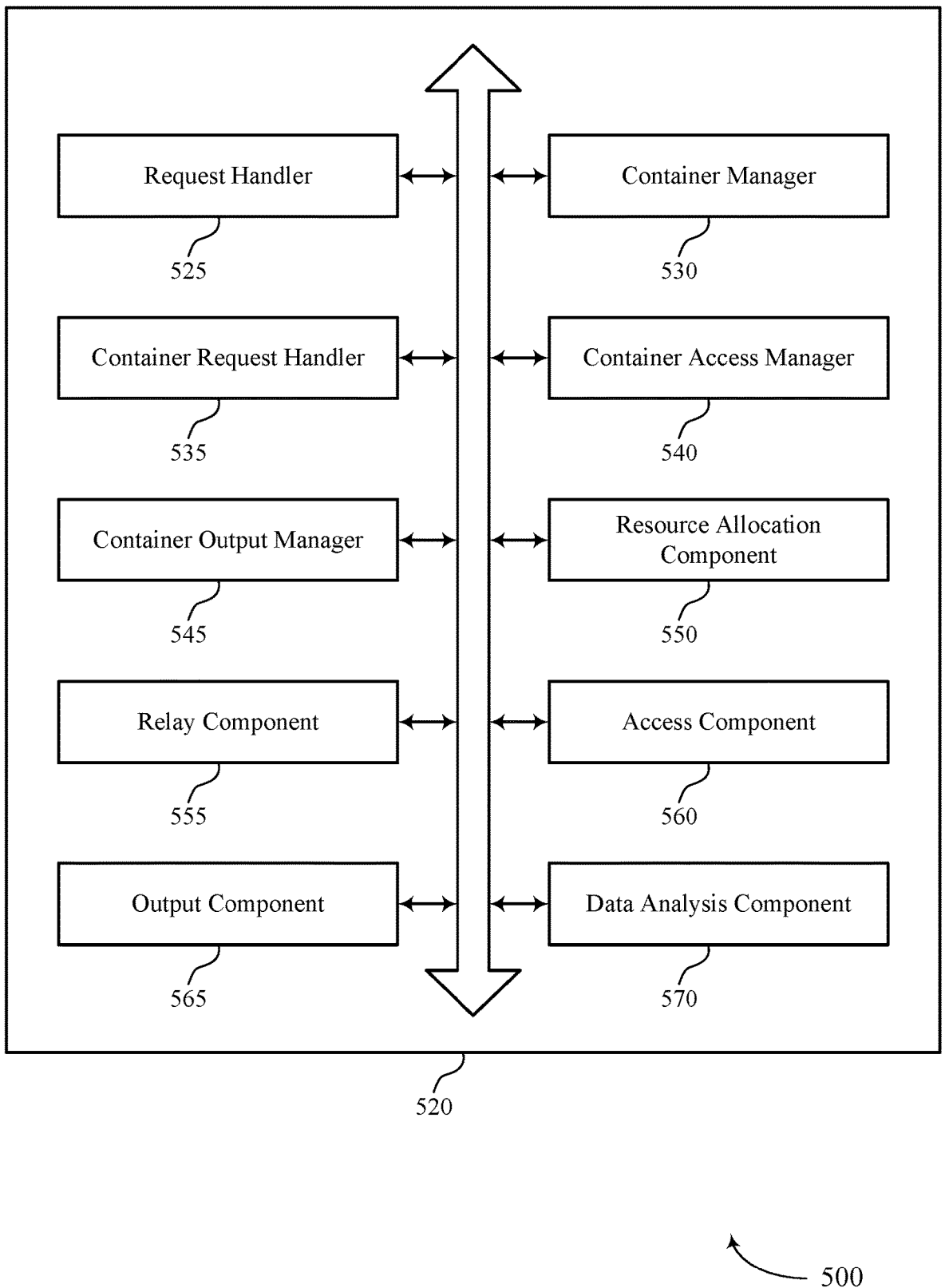
FIG. 5 shows a block diagram of a live mount manager that supports database live mounts using containers in accordance with examples as disclosed herein.

FIG. 5 shows a block diagram 500 of a live mount manager 520 that supports database live mounts using containers in accordance with examples as disclosed herein. The live mount manager 520 may be an example of aspects of a live mount manager or a live mount manager 420, or both, as described herein. The live mount manager 520, or various components thereof, may be an example of means for performing various aspects of database live mounts using containers as described herein. For example, the live mount manager 520 may include a request handler 525, a container manager 530, a container request handler 535, a container access manager 540, a container output manager 545, a resource allocation component 550, a relay component 555, an access component 560, an output component 565, a data analysis component 570, or any combination thereof. Each of these components may communicate, directly or indirectly, with one another (e.g., via one or more buses).

The request handler 525 may be configured as or otherwise support a means for receiving a request to mount a version of a database based on data that is stored at the computing system for the database. The container manager 530 may be configured as or otherwise support a means for creating a container at the computing system in response to the request to mount the version of the database, where the container is configured to support operating the version of the database. The container request handler 535 may be configured as or otherwise support a means for receiving, at the container, a database request associated with the version of the database. The container access manager 540 may be configured as or otherwise support a means for accessing, by the container and based on the database request, a set of data stored at the computing system and associated with the version of the database. The container output manager 545 may be configured as or otherwise support a means for outputting, by the container, a response to the database request based on accessing the set of data.

In some examples, the container manager 530 may be configured as or otherwise support a means for downloading an image including code for running a database application for operating the database, where the container is created using the image.

In some examples, the container manager 530 may be configured as or otherwise support a means for determining, based on receiving the request to mount the version of the database, a database application used by the version of the database. In some examples, the container manager 530 may be configured as or otherwise support a means for selecting, from a set of multiple images stored at the computing system, an image including code for running the database application, where the container is created using the image.

In some examples, the resource allocation component 550 may be configured as or otherwise support a means for allocating, based on creating the container, computing resources of the computing system to the container.

In some examples, the computing resources of the computing system include processing resources, memory resources, networking resources, or any combination thereof.

In some examples, the resource allocation component 550 may be configured as or otherwise support a means for determining one or more characteristics of the version of the database, where an amount of the computing resources allocated to the container is based on the one or more characteristics.

In some examples, the one or more characteristics includes a size of the version of the database, a quantity of tables included in the version of the database, a size of the tables included in the version of the database, a type of data included in the version of the database, a database type of the version of the database, or any combination thereof.

In some examples, the resource allocation component 550 may be configured as or otherwise support a means for receiving, with the request to mount the version of the database, an indication of a requested amount of computing resources for allocation to the container, where an amount of the computing resources allocated to the container is based on the requested amount.

In some examples, the request handler 525 may be configured as or otherwise support a means for receiving, at the computing system, the database request. In some examples, the relay component 555 may be configured as or otherwise support a means for relaying, by the computing system, the database request to the container.

In some examples, the access component 560 may be configured as or otherwise support a means for receiving, at the computing system and from the container, a request to access the set of data based on relaying the database request to the container. In some examples, the output component 565 may be configured as or otherwise support a means for providing, in response to the request to access the set of data, the container access to the data associated with the version of the database.

In some examples, to support accessing the set of data, the access component 560 may be configured as or otherwise support a means for reading from the set of data associated with the version of the database. In some examples, to support accessing the set of data, the access component 560 may be configured as or otherwise support a means for writing to the set of data associated with the version of the database. In some examples, to support accessing the set of data, the access component 560 may be configured as or otherwise support a means for processing the set of data associated with the version of the database; or any combination thereof.

In some examples, to support outputting the response to the request, the output component 565 may be configured as or otherwise support a means for outputting the set of data associated with the version of the database based on reading a portion of the version of the database including the data associated with the version of the database. In some examples, to support outputting the response to the request, the output component 565 may be configured as or otherwise support a means for outputting an indication that the set of data associated with the version of the database was written to the version of the database. In some examples, to support outputting the response to the request, the output component 565 may be configured as or otherwise support a means for outputting a result of processing the set of data associated with the version of the database; or any combination thereof.

In some examples, the container manager 530 may be configured as or otherwise support a means for creating a second container at the computing system in response to a second request to materialize the version of the database. In some examples, the data analysis component 570 may be configured as or otherwise support a means for running, at the second container, a process for verifying the data of the version of the database.

In some examples, the container manager 530 may be configured as or otherwise support a means for creating a second container at the computing system in response to a second request to materialize the version of the database. In some examples, the data analysis component 570 may be configured as or otherwise support a means for running, at the second container, a process for scanning the version of the database for malware.

In some examples, the container manager 530 may be configured as or otherwise support a means for creating a second container at the computing system in response to a second request to materialize the version of the database. In some examples, the data analysis component 570 may be configured as or otherwise support a means for running, at the second container, a process for analyzing content of the version of the database.

Figure 6:
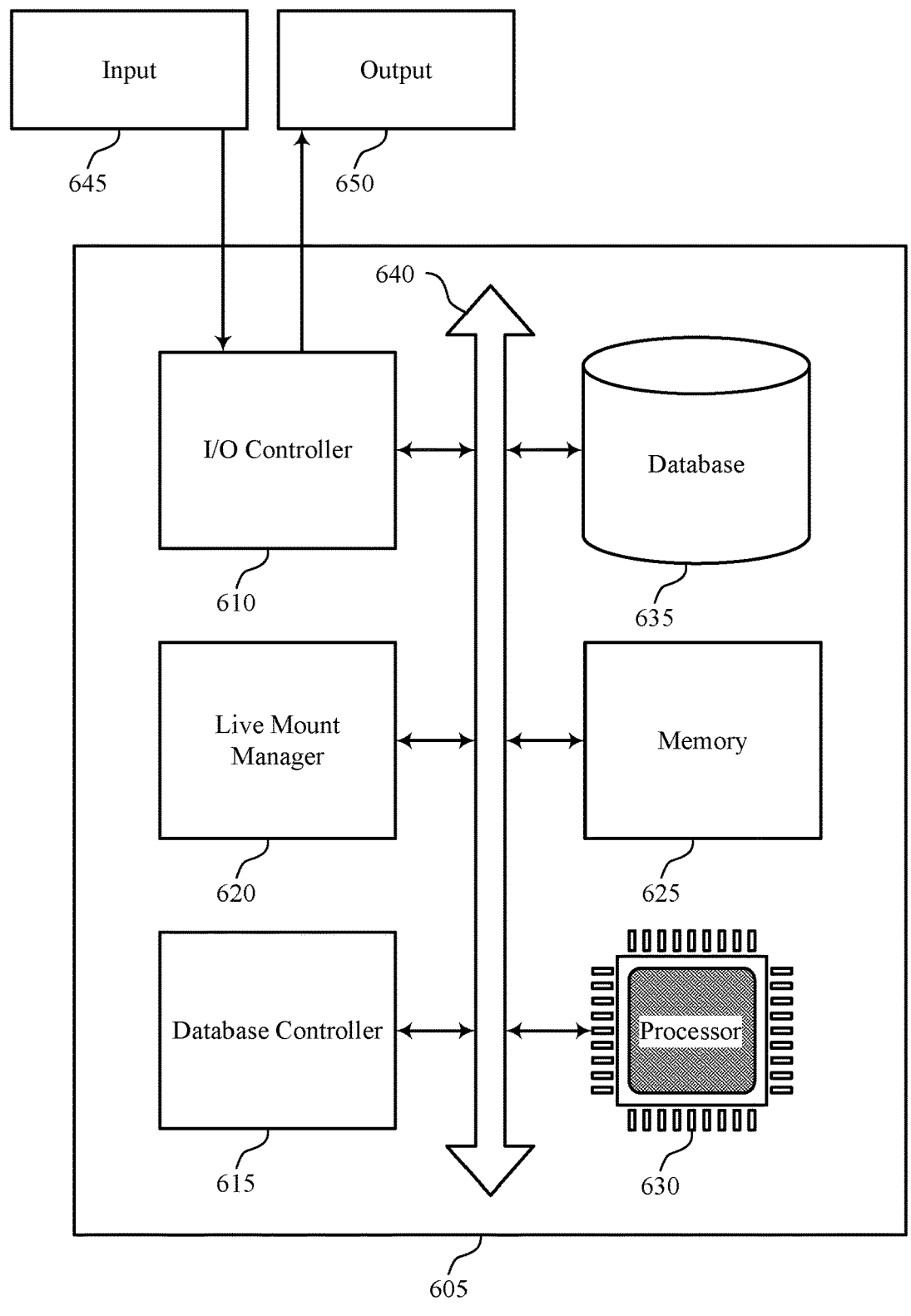
FIG. 6 shows a diagram of a system including a device that supports database live mounts using containers in accordance with examples as disclosed herein.

FIG. 6 shows a diagram of a system 600 including a device 605 that supports database live mounts using containers in accordance with examples as disclosed herein. The device 605 may be an example of or include the components of a device 405 as described herein. The device 605 may include components for bi-directional data communications including components for transmitting and receiving communications, such as a live mount manager 620, an I/O controller 610, a database controller 615, a memory 625, a processor 630, and a database 635. These components may be in electronic communication or otherwise coupled (e.g., operatively, communicatively, functionally, electronically, electrically) via one or more buses (e.g., a bus 640).

The I/O controller 610 may manage input signals 645 and output signals 650 for the device 605. The I/O controller 610 may also manage peripherals not integrated into the device 605. In some cases, the I/O controller 610 may represent a physical connection or port to an external peripheral. In some cases, the I/O controller 610 may utilize an operating system such as iOS®, ANDROID®, MS-DOS®, MS-WINDOWS®, OS/2®, UNIX®, LINUX®, or another known operating system. In other cases, the I/O controller 610 may represent or interact with a modem, a keyboard, a mouse, a touchscreen, or a similar device. In some cases, the I/O controller 610 may be implemented as part of a processor 630. In some examples, a user may interact with the device 605 via the I/O controller 610 or via hardware components controlled by the I/O controller 610.

The database controller 615 may manage data storage and processing in a database 635. In some cases, a user may interact with the database controller 615. In other cases, the database controller 615 may operate automatically without user interaction. The database 635 may be an example of a single database, a distributed database, multiple distributed databases, a data store, a data lake, or an emergency backup database.

Memory 625 may include random-access memory (RAM) and ROM. The memory 625 may store computer-readable, computer-executable software including instructions that, when executed, cause the processor 630 to perform various functions described herein. In some cases, the memory 625 may contain, among other things, a BIOS which may control basic hardware or software operation such as the interaction with peripheral components or devices.

The processor 630 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 630 may be configured to operate a memory array using a memory controller. In other cases, a memory controller may be integrated into the processor 630. The processor 630 may be configured to execute computer-readable instructions stored in a memory 625 to perform various functions (e.g., functions or tasks supporting database live mounts using containers).

For example, the live mount manager 620 may be configured as or otherwise support a means for receiving a request to mount a version of a database based on data that is stored at the computing system for the database. The live mount manager 620 may be configured as or otherwise support a means for creating a container at the computing system in response to the request to mount the version of the database, where the container is configured to support operating the version of the database. The live mount manager 620 may be configured as or otherwise support a means for receiving, at the container, a database request associated with the version of the database. The live mount manager 620 may be configured as or otherwise support a means for accessing, by the container and based on the database request, a set of data stored at the computing system and associated with the version of the database. The live mount manager 620 may be configured as or otherwise support a means for outputting, by the container, a response to the database request basing at least in part on accessing the set of data.

Figure 7:
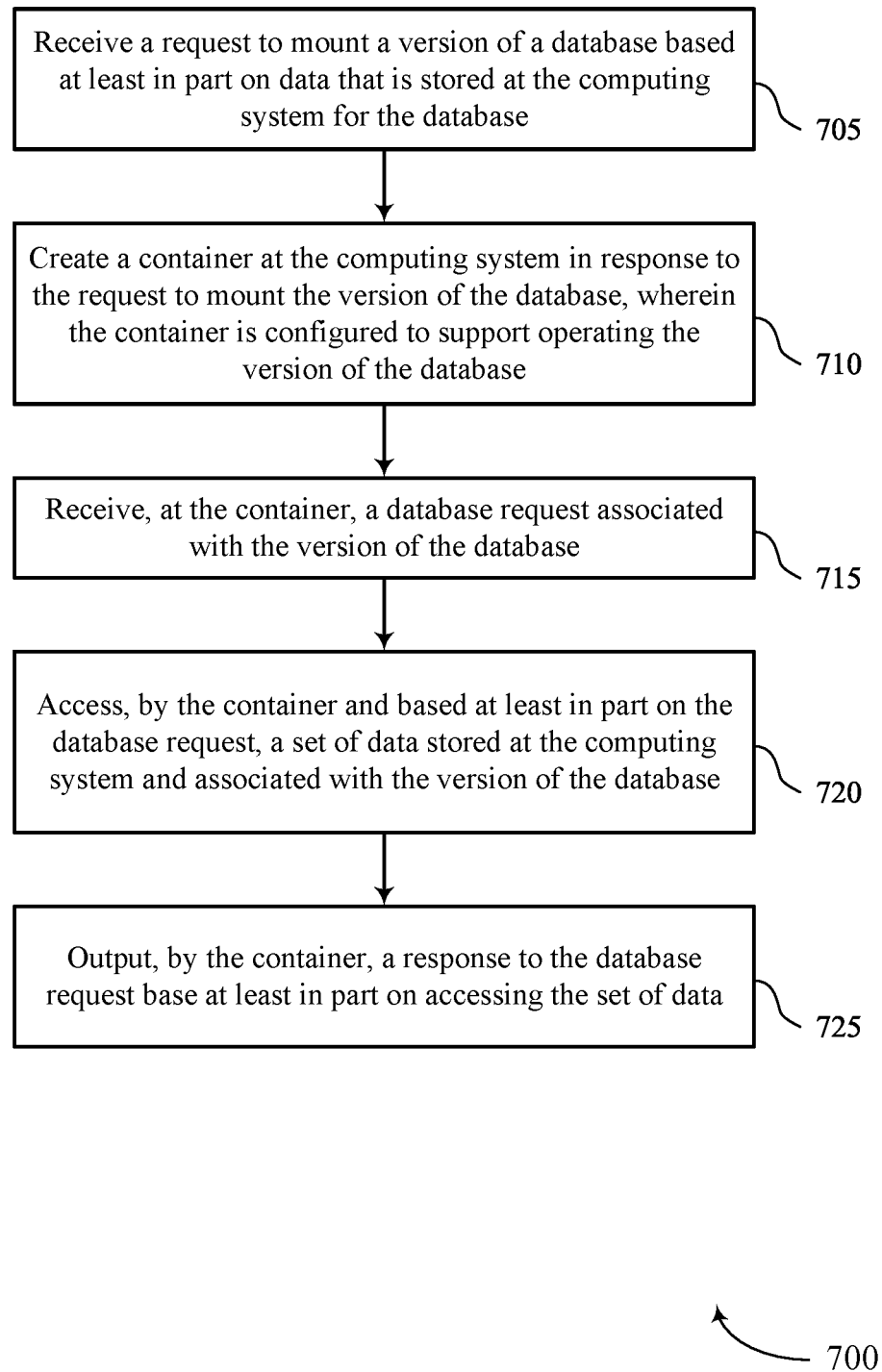
FIG. 7 shows a flowchart illustrating methods that support database live mounts using containers in accordance with examples as disclosed herein.

FIG. 7 shows a flowchart illustrating a method 700 that supports database live mounts using containers in accordance with examples as disclosed herein. The operations of the method 700 may be implemented by a storage appliance or its components as described herein. For example, the operations of the method 700 may be performed by a storage appliance as described with reference to FIGS. 1 through 6. In some examples, a storage appliance may execute a set of instructions to control the functional elements of the storage appliance to perform the described functions. Additionally, or alternatively, the storage appliance may perform aspects of the described functions using special-purpose hardware.

At 705, the method may include receiving a request to mount a version of a database based on data that is stored at the computing system for the database. The operations of 705 may be performed in accordance with examples as disclosed herein. In some examples, aspects of the operations of 705 may be performed by a request handler 525 as described with reference to FIG. 5.

At 710, the method may include creating a container at the computing system in response to the request to mount the version of the database, where the container is configured to support operating the version of the database. The operations of 710 may be performed in accordance with examples as disclosed herein. In some examples, aspects of the operations of 710 may be performed by a container manager 530 as described with reference to FIG. 5.

At 715, the method may include receiving, at the container, a database request associated with the version of the database. The operations of 715 may be performed in accordance with examples as disclosed herein. In some examples, aspects of the operations of 715 may be performed by a container request handler 535 as described with reference to FIG. 5.

At 720, the method may include accessing, by the container and based on the database request, a set of data stored at the computing system and associated with the version of the database. The operations of 720 may be performed in accordance with examples as disclosed herein. In some examples, aspects of the operations of 720 may be performed by a container access manager 540 as described with reference to FIG. 5.

At 725, the method may include outputting, by the container, a response to the database request based on accessing the set of data. The operations of 725 may be performed in accordance with examples as disclosed herein. In some examples, aspects of the operations of 725 may be performed by a container output manager 545 as described with reference to FIG. 5.

A method is described. The method may include receiving a request to mount a version of a database based on data that is stored at the computing system for the database, creating a container at the computing system in response to the request to mount the version of the database, where the container is configured to support operating the version of the database, receiving, at the container, a database request associated with the version of the database, accessing, by the container and based on the database request, a set of data stored at the computing system and associated with the version of the database, and outputting, by the container, a response to the database request based on accessing the set of data.

An apparatus is described. The apparatus may include a processor, memory coupled with the processor, and instructions stored in the memory. The instructions may be executable by the processor to cause the apparatus to receive a request to mount a version of a database based on data that is stored at the computing system for the database, create a container at the computing system in response to the request to mount the version of the database, where the container is configured to support operating the version of the database, receive, at the container, a database request associated with the version of the database, access, by the container and based on the database request, a set of data stored at the computing system and associated with the version of the database, and outputting, by the container, a response to the database request base at least in part on accessing the set of data.

Another apparatus is described. The apparatus may include means for receiving a request to mount a version of a database based on data that is stored at the computing system for the database, means for creating a container at the computing system in response to the request to mount the version of the database, where the container is configured to support operating the version of the database, means for receiving, at the container, a database request associated with the version of the database, means for accessing, by the container and based on the database request, a set of data stored at the computing system and associated with the version of the database, and means for outputting, by the container, a response to the database request based on accessing the set of data.

A non-transitory, computer-readable medium storing code is described. The code may include instructions executable by a processor to receive a request to mount a version of a database based on data that is stored at the computing system for the database, create a container at the computing system in response to the request to mount the version of the database, where the container is configured to support operating the version of the database, receive, at the container, a database request associated with the version of the database, access, by the container and based on the database request, a set of data stored at the computing system and associated with the version of the database, and outputting, by the container, a response to the database request base at least in part on accessing the set of data.

Some examples of the method, apparatuses, and non-transitory, computer-readable medium described herein may further include operations, features, means, or instructions for downloading an image including code for running a database application for operating the database, where the container may be created using the image.

Some examples of the method, apparatuses, and non-transitory, computer-readable medium described herein may further include operations, features, means, or instructions for determining, based on receiving the request to mount the version of the database, a database application used by the version of the database and selecting, from a set of multiple images stored at the computing system, an image including code for running the database application, where the container may be created using the image.

Some examples of the method, apparatuses, and non-transitory, computer-readable medium described herein may further include operations, features, means, or instructions for allocating, based on creating the container, computing resources of the computing system to the container.

In some examples of the method, apparatuses, and non-transitory, computer-readable medium described herein, the computing resources of the computing system include processing resources, memory resources, networking resources, or any combination thereof.

Some examples of the method, apparatuses, and non-transitory, computer-readable medium described herein may further include operations, features, means, or instructions for determining one or more characteristics of the version of the database, where an amount of the computing resources allocated to the container may be based on the one or more characteristics.

In some examples of the method, apparatuses, and non-transitory, computer-readable medium described herein, the one or more characteristics includes a size of the version of the database, a quantity of tables included in the version of the database, a size of the tables included in the version of the database, a type of data included in the version of the database, a database type of the version of the database, or any combination thereof.

Some examples of the method, apparatuses, and non-transitory, computer-readable medium described herein may further include operations, features, means, or instructions for receiving, with the request to mount the version of the database, an indication of a requested amount of computing resources for allocation to the container, where an amount of the computing resources allocated to the container may be based on the requested amount.

Some examples of the method, apparatuses, and non-transitory, computer-readable medium described herein may further include operations, features, means, or instructions for receiving, at the computing system, the database request and relaying, by the computing system, the database request to the container.

Some examples of the method, apparatuses, and non-transitory, computer-readable medium described herein may further include operations, features, means, or instructions for receiving, at the computing system and from the container, a request to access the set of data based on relaying the database request to the container and providing, in response to the request to access the set of data, the container access to the data associated with the version of the database.

In some examples of the method, apparatuses, and non-transitory, computer-readable medium described herein, accessing the set of data may include operations, features, means, or instructions for reading from the set of data associated with the version of the database, writing to the set of data associated with the version of the database, and processing the set of data associated with the version of the database; or any combination thereof.

In some examples of the method, apparatuses, and non-transitory, computer-readable medium described herein, outputting the response to the request may include operations, features, means, or instructions for outputting the set of data associated with the version of the database based on reading a portion of the version of the database including the data associated with the version of the database, outputting an indication that the set of data associated with the version of the database was written to the version of the database, and outputting a result of processing the set of data associated with the version of the database; or any combination thereof.

Some examples of the method, apparatuses, and non-transitory, computer-readable medium described herein may further include operations, features, means, or instructions for creating a second container at the computing system in response to a second request to materialize the version of the database and running, at the second container, a process for verifying the data of the version of the database.

Some examples of the method, apparatuses, and non-transitory, computer-readable medium described herein may further include operations, features, means, or instructions for creating a second container at the computing system in response to a second request to materialize the version of the database and running, at the second container, a process for scanning the version of the database for malware.

Some examples of the method, apparatuses, and non-transitory, computer-readable medium described herein may further include operations, features, means, or instructions for creating a second container at the computing system in response to a second request to materialize the version of the database and running, at the second container, a process for analyzing content of the version of the database.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory, computer-readable media can comprise RAM, ROM, electrically erasable programmable ROM (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   receiving, at a storage appliance, from a computing system that is communicatively coupled with the storage appliance via an external network, a request to mount, at the storage appliance, a version of a database based at least in part on data that is stored at the storage appliance for the database;
   creating, by the storage appliance, a container at the storage appliance in response to the request to mount the version of the database, wherein creating the container comprises allocating computing resources to the container and installing software for operating the version of the database on the computing resources;
   receiving, at the container from the computing system, a database request associated with the version of the database;
   accessing, by the container and based at least in part on the database request, a set of data stored at the storage appliance and external to the container, the set of data being associated with the version of the database; and
   outputting, by the container to the computing system, a response to the database request based at least in part on accessing the set of data.

2. The method of claim 1, further comprising:
   downloading an image comprising code for running a database application for operating the database, wherein the container is created using the image.

3. The method of claim 1, further comprising:
   determining, based at least in part on receiving the request to mount the version of the database, a database application used by the version of the database; and
   selecting, from a plurality of images stored at the storage appliance, an image comprising code for running the database application, wherein the container is created using the image.

4. The method of claim 1, wherein the computing resources of the storage appliance comprise processing resources, memory resources, networking resources, or any combination thereof.

5. The method of claim 1, further comprising:
   determining one or more characteristics of the version of the database, wherein an amount of the computing resources allocated to the container is based at least in part on the one or more characteristics.

6. The method of claim 5, wherein the one or more characteristics comprises a size of the version of the database, a quantity of tables included in the version of the database, a size of the tables included in the version of the database, a type of data included in the version of the database, a database type of the version of the database, or any combination thereof.

7. The method of claim 1, further comprising:
   receiving, with the request to mount the version of the database, an indication of a requested amount of computing resources for allocation to the container, wherein an amount of the computing resources allocated to the container is based at least in part on the requested amount of computing resources.

8. The method of claim 1, further comprising:
   receiving, at the storage appliance, the database request; and
   relaying, by the storage appliance, the database request to the container.

9. The method of claim 8, further comprising:
   receiving, at the storage appliance and from the container, a request to access the set of data based at least in part on relaying the database request to the container; and
   providing, in response to the request to access the set of data, the container access to the data associated with the version of the database.

10. The method of claim 1, wherein accessing the set of data comprises:
    reading from the set of data associated with the version of the database;
    writing to the set of data associated with the version of the database;
    processing the set of data associated with the version of the database; or
    any combination thereof.

11. The method of claim 1, wherein outputting the response to the database request comprises:
    outputting the set of data associated with the version of the database based at least in part on reading a portion of the version of the database comprising the data associated with the version of the database;
    outputting an indication that the set of data associated with the version of the database was written to the version of the database;
    outputting a result of processing the set of data associated with the version of the database; or
    any combination thereof.

12. The method of claim 1, further comprising:
    creating a second container at the storage appliance in response to a second request to materialize the version of the database; and
    running, at the second container, a process for verifying the data of the version of the database.

13. The method of claim 1, further comprising:
    creating a second container at the storage appliance in response to a second request to materialize the version of the database; and
    running, at the second container, a process for scanning the version of the database for malware.

14. The method of claim 1, further comprising:
    creating a second container at the storage appliance in response to a second request to materialize the version of the database; and
    running, at the second container, a process for analyzing content of the version of the database.

15. A storage appliance, comprising:
one or more processors; and
memory coupled with the one or more processors, wherein instructions stored in the memory are executable by the processor one or more processors, individually or collectively, to cause the storage appliance to:
receive a request to mount a version of a database based at least in part on data that is stored at the storage appliance for the database;
create a container at the storage appliance in response to the request to mount the version of the database, wherein, to create the container, the instructions are further executable by the one or more processors, individually or collectively, to cause the storage appliance to allocate computing resources to the container and to cause the storage appliance to install software for operating the version of the database on the computing resources;
receive, at the container, a database request associated with the version of the database;
access, by the container and based at least in part on the database request, a set of data stored at the storage appliance and associated with the version of the database; and
output, by the container, a response to the database request based at least in part on accessing the set of data.

16. The storage appliance of claim 15, wherein the instructions are further executable by the one or more processors, individually or collectively, to cause the storage appliance to:
determine, based at least in part on receiving the request to mount the version of the database, a database application used by the version of the database; and
select, from a plurality of images stored at the storage appliance, an image comprising code for running the database application, wherein the container is created using the image.

17. A non-transitory, computer-readable medium storing code at a storage appliance, the code comprising instructions executable by one or more processors, individually or collectively, to:
receive a request to mount a version of a database based at least in part on data that is stored at the storage appliance for the database;
create a container at the storage appliance in response to the request to mount the version of the database, wherein, to create the container, the instructions are further executable by the one or more processors, individually or collectively, to allocate computing resources to the container and to install software for operating the version of the database on the computing resources;
receive, at the container, a database request associated with the version of the database;
access, by the container and based at least in part on the database request, a set of data stored at the storage appliance and associated with the version of the database; and
output, by the container, a response to the database request based at least in part on accessing the set of data.

18. The non-transitory, computer-readable medium of claim 17, wherein the code is further executable by the one or more processors, individually or collectively, to:
determine, based at least in part on receiving the request to mount the version of the database, a database application used by the version of the database; and
select, from a plurality of images stored at the storage appliance, an image comprising code for running the database application, wherein the container is created using the image.

* * * * *